(12) United States Patent
Yang

(10) Patent No.: US 8,102,856 B2
(45) Date of Patent: Jan. 24, 2012

(54) METHOD OF IMPLEMENTING TRAVERSAL OF MULTIMEDIA PROTOCOLS THROUGH NETWORK ADDRESS TRANSLATION DEVICE

(75) Inventor: Shu Yang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/661,047

(22) Filed: Mar. 10, 2010

(65) Prior Publication Data

US 2010/0189108 A1    Jul. 29, 2010

Related U.S. Application Data

(63) Continuation of application No. 10/570,328, filed on Nov. 27, 2006, now Pat. No. 7,706,370.

(30) Foreign Application Priority Data

Sep. 2, 2003   (CN) .................. 03 1 59214

(51) Int. Cl.
*H04L 12/28* (2006.01)

(52) U.S. Cl. ........ 370/392; 370/229; 370/352; 370/400; 370/401

(58) Field of Classification Search ............. 370/229, 370/352, 392, 400, 401
See application file for complete search history.

(56) References Cited

U.S. PATENT DOCUMENTS

| | | | |
|---|---|---|---|
| 5,546,382 A * | 8/1996 | Fujino | 455/405 |
| 5,796,740 A * | 8/1998 | Perlman et al. | 370/401 |
| 5,956,681 A * | 9/1999 | Yamakita | 704/260 |
| 6,128,298 A | 10/2000 | Wootton et al. | |
| 6,128,664 A * | 10/2000 | Yanagidate et al. | 709/228 |
| 6,360,265 B1 | 3/2002 | Falck et al. | |
| 6,421,339 B1 | 7/2002 | Thomas | |
| 6,628,943 B1 | 9/2003 | Agrawal et al. | |
| 6,697,377 B1 * | 2/2004 | Ju et al. | 370/466 |
| 6,760,780 B1 * | 7/2004 | Chitturi et al. | 709/248 |
| 6,768,743 B1 | 7/2004 | Borella et al. | |
| 6,879,593 B1 * | 4/2005 | Kunze et al. | 370/401 |
| 6,885,667 B1 * | 4/2005 | Wilson | 370/392 |
| 6,928,082 B2 * | 8/2005 | Liu et al. | 370/401 |
| 6,944,167 B1 * | 9/2005 | McPherson | 370/401 |
| 6,961,351 B1 | 11/2005 | Fukushima et al. | |

(Continued)

FOREIGN PATENT DOCUMENTS

CN    1406026 A    3/2003

(Continued)

OTHER PUBLICATIONS

International Search Report dated Dec. 9, 2004 in connection with PCT Application No. PCT/CN2004/001007.

(Continued)

*Primary Examiner* — Ayaz Sheikh
*Assistant Examiner* — Andrew C Lee

(57) ABSTRACT

The present invention discloses a method of implementing traversal of multimedia protocols through Network Address Translation device, wherein the Network Address Translation (NAT) device establishes a mapping relationship between address of a terminal in a private network and address of a terminal in a public network, and enables the terminal in the private network to access the public network with a common address, so as to implement the interaction of media streams between the terminal in the private network and the terminal in the public network, in which the common address is a address of the private network for accessing the public network.

12 Claims, 2 Drawing Sheets

U.S. PATENT DOCUMENTS

| | | | |
|---|---|---|---|
| 6,985,479 B2 * | 1/2006 | Leung et al. | 370/352 |
| 6,993,012 B2 * | 1/2006 | Liu et al. | 370/352 |
| 7,042,876 B1 * | 5/2006 | Jayasenan et al. | 370/389 |
| 7,072,332 B2 | 7/2006 | D'Souza | |
| 7,082,134 B1 * | 7/2006 | Lim et al. | 370/392 |
| 7,206,312 B2 | 4/2007 | Kong | |
| 7,224,687 B2 * | 5/2007 | Shah et al. | 370/352 |
| 7,257,837 B2 | 8/2007 | Xu et al. | |
| 7,280,557 B1 * | 10/2007 | Biswas et al. | 370/465 |
| 7,298,742 B2 * | 11/2007 | Chuang | 370/389 |
| 7,328,280 B2 | 2/2008 | Takeda et al. | |
| 7,346,770 B2 * | 3/2008 | Swander et al. | 713/153 |
| 7,352,710 B1 * | 4/2008 | Panburana et al. | 370/282 |
| 7,512,708 B2 * | 3/2009 | Read | 709/245 |
| 7,694,127 B2 * | 4/2010 | Adams et al. | 713/151 |
| 2002/0042832 A1 | 4/2002 | Fallentine et al. | |
| 2002/0085561 A1 * | 7/2002 | Choi et al. | 370/392 |
| 2002/0114319 A1 | 8/2002 | Liu et al. | |
| 2002/0133549 A1 | 9/2002 | Warrier et al. | |
| 2003/0048780 A1 | 3/2003 | Phomsopha | |
| 2003/0093563 A1 | 5/2003 | Young et al. | |
| 2003/0188001 A1 | 10/2003 | Eisenberg et al. | |
| 2004/0017818 A1 * | 1/2004 | Chung | 370/401 |
| 2004/0037268 A1 | 2/2004 | Read | |
| 2004/0052257 A1 * | 3/2004 | Abdo et al. | 370/392 |
| 2004/0059942 A1 | 3/2004 | Xie | |
| 2004/0066788 A1 * | 4/2004 | Lin et al. | 370/401 |
| 2004/0139227 A1 * | 7/2004 | Takeda | 709/245 |
| 2004/0210774 A1 | 10/2004 | Chitturi et al. | |
| 2004/0249975 A1 | 12/2004 | Tuck et al. | |
| 2005/0063398 A1 | 3/2005 | Choudhury et al. | |
| 2005/0193420 A1 * | 9/2005 | Hocevar et al. | 725/80 |
| 2006/0018308 A1 * | 1/2006 | Choi et al. | 370/352 |
| 2006/0168321 A1 * | 7/2006 | Eisenberg et al. | 709/238 |
| 2007/0266161 A1 * | 11/2007 | Kenrick et al. | 709/227 |
| 2008/0151917 A1 | 6/2008 | Bartlett et al. | |
| 2008/0276007 A1 | 11/2008 | Chitturi et al. | |
| 2008/0310438 A1 | 12/2008 | Jabri et al. | |
| 2010/0269172 A1 * | 10/2010 | Xie | 726/14 |

FOREIGN PATENT DOCUMENTS

| | | |
|---|---|---|
| CN | 1411220 A | 4/2003 |
| CN | 1516409 A | 7/2004 |
| CN | 1592300 A | 3/2005 |
| WO | WO 01/30036 A1 | 4/2001 |
| WO | WO 02/03217 A1 | 1/2002 |
| WO | WO 02/45373 A2 | 6/2002 |
| WO | WO 03/001756 A1 | 1/2003 |

OTHER PUBLICATIONS

Written Opinion of the International Searching Authority dated Dec. 9, 2004 in connection with PCT Application No. PCT/CN2004/001007.

Supplementary European Search Report, issued Application No. 04762142.0, dated Aug. 25, 2006.

Communication pursuant to Article 96(2) EPC dated Jan. 11, 2007 in connection with European Patent Application No. 04 762 142.0.

* cited by examiner

METHOD OF IMPLEMENTING TRAVERSAL OF MULTIMEDIA PROTOCOLS THROUGH NETWORK ADDRESS TRANSLATION DEVICE

CROSS-REFERENCE TO RELATED APPLICATIONS

This application is a continuation of U.S. patent application Ser. No. 10/570,328, filed on Nov. 27, 2006, now U.S. Pat. No. 7,706,370, which is a national stage of International Application No. PCT/CN2004/001007, filed on Aug. 31, 2004, which claims priority to Chinese Patent Application No. 03159214.7, filed on Sep. 2, 2003, all of which are hereby incorporated by reference in their entireties.

FIELD OF THE INVENTION

The present invention relates to multimedia communication technology, particularly to a method of implementing traversal of multimedia protocols through Network Address Translation device.

BACKGROUND OF THE INVENTION

All multimedia communication protocols involve transmission of media streams (audio/video streams); and it is more suitable to use UDP protocol for transmission of media streams in IP networks. Therefore, presently, most of the multimedia communication protocols employ UDP to carry media streams. However, as UDP is a non-connection-oriented transport layer protocol, Network Address Translation (NAT) devices are unable to determine which private network the incoming UDP packets should be forwarded to; as a result, UDP packets transmitted from a public network to a private network will be rejected by the NAT devices, resulting in the final fail of multimedia communication.

The modes for address translation of NAT device can be classified into: static NAT, dynamic NAT, and NAPT (Network Address Port Translation). At present, solutions for traversal of multimedia communication protocol through NAT in either of the first two NAT modes described above are available: static NAT solution and dynamic NAT solution.

The static NAT solution is implemented as follows: The private network IP addresses of terminals requesting for multimedia communication are mapped to public network IP addresses at NAT, that is, NAT reserves public network IP addresses for the multimedia terminals in private networks in advance.

Based on the static NAT solution, a dynamic NAT solution is introduced: when there is multimedia communication (detected at a known port, for example, the calling known port for H.323 protocol is 1720), NAT assigns a certain public network IP address to the multimedia terminal in the private network dynamically, till the multimedia communication is terminated. Though this solution has been improved compared with the static NAT solution, it is still impossible to save IP address resources in public networks. This is because once a certain public network IP address is assigned to a certain private network terminal, other terminals can not use this public network IP address before the multimedia communication of this terminal is terminated.

However, for NAPT mode, there is still no solution for traversal of multimedia communication protocol through NAT. NAT devices are designed to save public network IP address resources. But it is impossible for a public network IP address to be shared by multiple multimedia communication terminals in a private network in the existing solutions. In many cases involving private network terminals (or other H.323 nodes), waste of public network IP addresses is inevitable, causing the major function of NAT devices—saving public network IP addresses—to be meaningless in multimedia applications.

SUMMARY OF THE INVENTION

The object of the present invention is to provide a method of implementing traversal of multimedia protocols through Network Address Translation device, so as to solve the problem that multimedia communication protocols are unable to traverse through NAT device in NAPT mode in the prior art.

The present invention provide a technical solution to solve the above problem, the technical solution is as follows:

A method of implementing traversal of multimedia protocols through Network Address Translation device, the Network Address Translation (NAT) device establishes a mapping relationship between address of a terminal in a private network and address of a terminal in a public network, and enables the terminal in the private network to access the public network with a common address, so as to implement the interaction of media streams between the terminal in the private network and the terminal in the public network, in which the common address is a address of the private network for accessing the public network, wherein the method comprises the following steps:

the terminal in the private network acquires the address of the terminal in the public network for sending media streams;

the terminal in the private network sends a redirect packet, in which destination address of the redirect packet is the address of the terminal in the public network for sending media streams;

the NAT device replaces source address in the redirect packet with the common address and sends the replaced redirect packet to the terminal of the public network, and establishes a mapping relationship between the addresses in the redirect packet before the replacement and the addresses in the redirect packet after the replacement;

The terminal in the public network sends media stream, in which destination address of the media stream is the common address, The NAT device replaces the destination address in the media stream with the address of the terminal in the private network in accordance with the mapping relationship.

In accordance with the solution described above:

The source address in the redirect packet is the receiving port number and the private network IP address of the terminal of the private network.

The terminal in the private network sends a request message to the terminal in the public network to acquire the address of the terminal in the public network for sending media streams.

The terminal of the private network sends the request when the media stream sent from the terminal of the public network is not received within a preset time period after the 'Open Media Channel' signaling from the terminal of the public network has been received.

The preset time period is shorter than the time for which the terminal of the private network will disconnect automatically when there is no code stream received.

The terminal of the private network sends redirect packets periodically, in order to refresh the timeout time for the mapping relationship in the NAT device.

The terminal of the private network performing interaction through an extension field in protocol message when the terminal of the private network sends a request to the terminal of the public network to obtain the source address for sending media streams.

The present invention implements successful traversal of protocols without the need of modifying firewall (FW)/NAT device. With the present invention, the users can perform multimedia communication (e.g., H.323 communication) between public networks and private networks without the need of purchasing any new device; therefore, not only the problem of communication failure of multimedia communication protocols passing through NAT can be solved, but also one common public network IP address can be used, so as to save IP address resources of public networks.

DETAILED DESCRIPTION OF THE EMBODIMENTS

Hereinafter the present invention is described in an embodiment, with H.323 protocol which is a multimedia communication protocol that is most widely used as an example.

Figure 1:
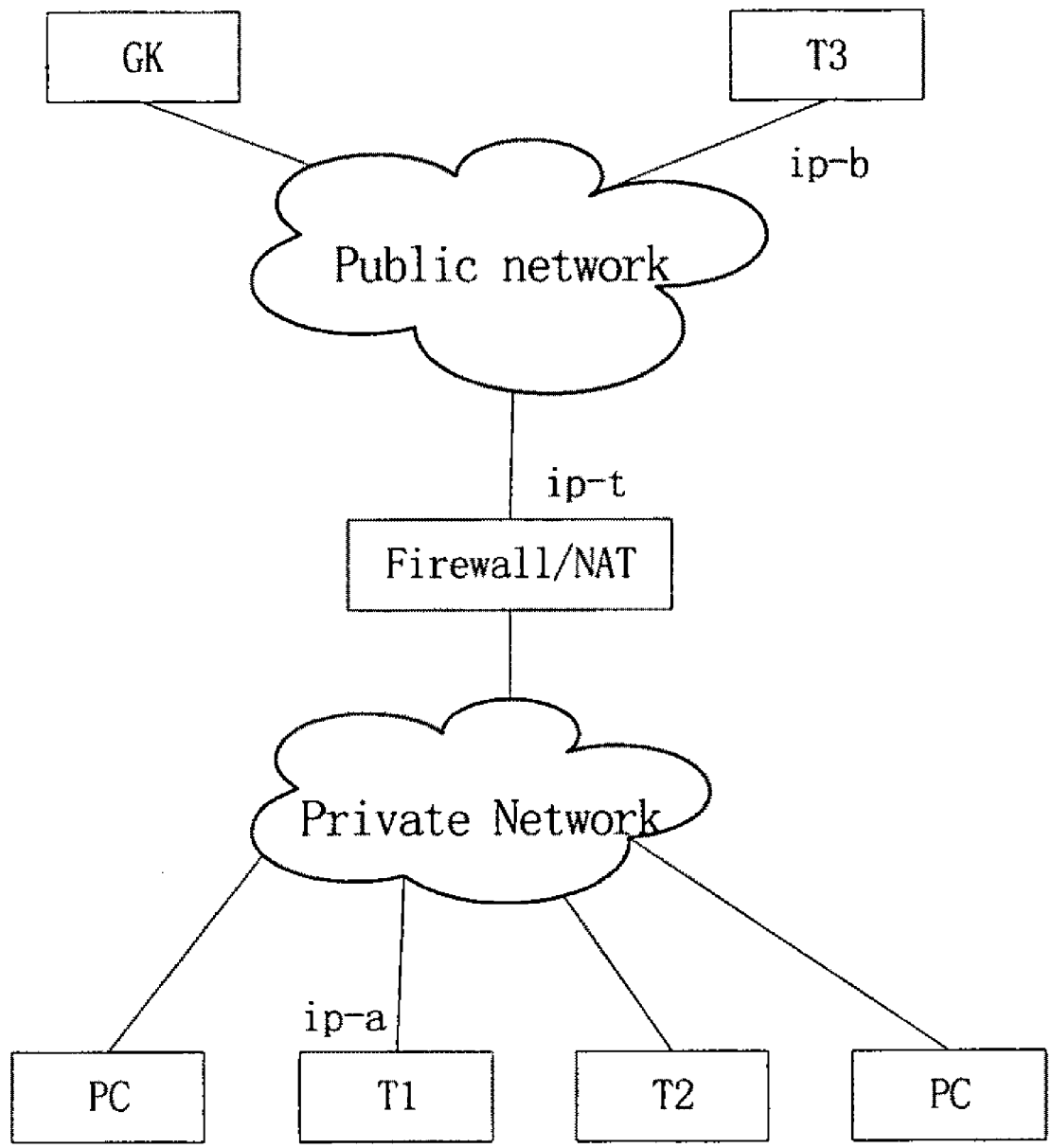
FIG. 1 is a schematic diagram of networking to embody the present invention.

Referring to FIG. 1, terminal T1 and T2 are two H.323 terminals in a private network; terminal T3 is a H.323 terminal in a public network; GK is a GateKeeper in H.323 protocol.

Figure 2:
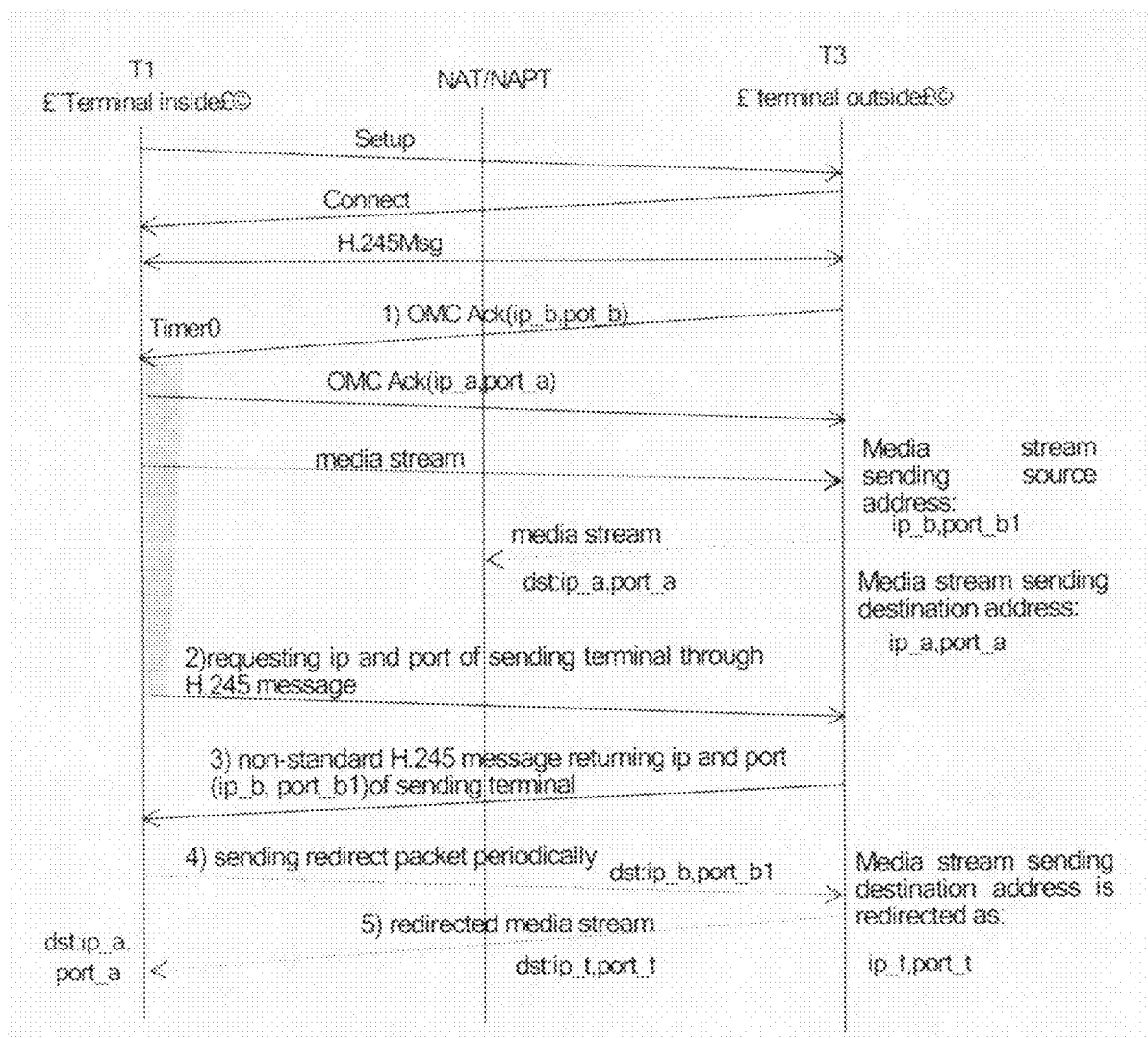
FIG. 2 is a flow diagram of an embodiment of present invention.

Referring to FIG. 2, the process that terminal T1 of the private network calls terminal T3 of the public network is as follows:

Terminal T1 of the private network sends a setup signaling to terminal T3 of the public network;
When receiving the setup signaling from terminal T1 of the private network, terminal T3 of the public network returns a connect signaling to terminal T1 of the private network;
T1 establishes a H.245 connection with T3 by utilizing the H.245 address of terminal T3 of the public network carried in the connect signaling; then, T1 and T3 perform H.245 signaling interaction with each other.

The above process fully complies with the specification of H.323 protocol. 'ITU-T Recommendation H.323' may be referred to for detailed information about the process.

As the interaction is fully compliant with the standard protocol, it is impossible for media streams to reach terminals of the private network from the public network. The present invention achieves the object of free communication between terminals of the public and private network by performing interaction of some extension information (not specified in the protocol) on the basis of the standard protocol. The process of the extension information interaction is detailed as follows:

1. When a terminal of the private network receives an 'Open Media Channel Ack (OMC Ack)' signaling from a opposite terminal (i.e., the terminal of the public network with which it connects), Timer 0 is started, in which the time interval of the timer should be shorter than the time for which the terminal disconnects automatically when there is no code stream received, preferably 5s.

Timer 0 will be stopped if a correct media stream is received within the time that Timer 0 is time out. That the terminal has received the media stream means that there is no NAT device which doesn't support H.323 protocol, normal communication can be performed without utilizing the method provided in the present invention; therefore, the calling process after Timer 0 is stopped follows the standard H.323 protocol, and the following steps are not necessary.

If terminal T1 of the private network has not received any media stream from terminal T3 of the public network after Timer 0 is time out, it means there is (are) NAT device(s) that doesn't (don't) support H.323 protocol; thus, the method provided in the present invention has to be used to enable media streams to traverse through NAT device(s) successfully, and the process has to be continued to step 2.

2. T1 requests for the source IP address (i.e., the source IP of the UDP packet header that carries the media stream) and source port (i.e., source port of the UDP packet header that carries the media stream) of the media stream through an extension field in H.245 message after Timer 0 is time out.

3. Similarly, terminal T3 of the public network notifies the terminal of the private network of the source IP address and source port (ip_b, port_b1) of the media stream through the extension field in H.245 message when it receives the request sent from terminal T1 of the private network.

4. The terminal of the private network sends periodically redirect packets which are defined in the following table to the source address (ip_b, port_b1) of the media stream of the opposite terminal when it receives the H.245 message carrying the extension field sent from the opposite terminal:

| UDP Header | Value | Description |
| --- | --- | --- |
| Source IP address | ip_a | IP address of terminal T1 of the private network (an address in the private network) |
| Destination IP address | ip_b | the redirect packet receiving IP address of terminal T3 of the public network (extracted from the extension field in H.245 message, i.e., the source IP address when T3 sends media stream to T1) |
| Source port | Port_a | Rtp receiving port number of T1 |
| Destination port | Port_b1 | The redirect packet receiving port of terminal T3 of the public network (extracted from the extension field in H.245 message, i.e., the source port number when T3 sends media stream to T1) |

NAT replaces the source address in the redirect packet with common public network address and establishes the mapping relationship between the source address and destination address before the replacement and the source address and destination address in the redirect packet after the replacement, when the redirect packet passes through the NAT device. If the firewall also employs NAT processing, the method is also applicable to the traversal through the firewall. The address mapping relationship formed is shown in the following table:

| Before firewall/NAT | | | | After firewall/NAT | | | |
| --- | --- | --- | --- | --- | --- | --- | --- |
| src ip | src port | dst ip | dst port | src ip | src port | dst ip | dst port |
| ip_a | port_a | ip_b | port_b1 | ip_t | port_t | ip_b | port_b1 |

Wherein, ip_t and port_t are public network addresses.

Since there is time-out time in the address mapping relationship in firewall/NAT device, terminal T1 of the private network refreshes the timeout time by sending redirect packets periodically, and it is possible to ensure that the terminal of public network can receive the redirect packets even when some of the redirect packets are lost.

5. Terminal T3 of the public network sets the destination address to which a certain media stream is sent to the source IP (ip_t) and source port (port_t) which extract the UDP header of a redirect packet from the redirect packet when T3 receives the redirect packet at the sending address (ip_b, port_b1) of the media stream. Then the media stream sent by Terminal T3 of the public network after redirection will reach terminal T1 of the private network through the reverse address mapping of the firewall/NAT device.

Though the present invention is described in above embodiment with H.323 protocol as an example, the calling process in other multimedia communication protocols, such as SIP protocol, is similar, except that the specific signaling name and field name are different; therefore, the present invention is also applicable to other multimedia communication protocols.

The invention claimed is:

1. A method for implementing traversal of multimedia protocols to enable a terminal in a private network to access a public network with a common address, the method comprising:
   acquiring, by the terminal in the private network, an address of a terminal in a public network for sending media streams;
   sending, by the terminal in the private network, a redirect packet to the terminal in the public network, in which a destination address of the redirect packet is the address of the terminal in the public network for sending media streams;
   wherein a source address in the redirect packet is replaced with the common address and a mapping relationship is established between the source address in the redirect packet before the replacement and the common address in the redirect packet after the replacement;
   wherein the terminal in the private network is operable for receiving the media streams from the terminal in the public network;
   wherein a destination address of the media streams is the common address which is replaced with the address of the terminal in the private network in accordance with the mapping relationship; and
   wherein the terminal in the private network sends redirect packets periodically to refresh timeout time for the mapping relationship.

2. The method according to claim 1, wherein before acquiring, by the terminal in the private network, the address of the terminal in the public network for sending media streams, the method comprises:
   receiving, by the terminal in the private network, an Open Media Channel Ack (OMC Ack) signaling from the terminal in the public network, and
   starting a timer.

3. The method according to claim 2, wherein a time interval of the timer is shorter than a time for which the terminal in the private network disconnects automatically when no code stream received.

4. The method according to claim 1, wherein the terminal of the private network performs interaction through an extension field in a protocol message when the terminal of the private network sends a request message to the terminal in the public network.

5. The method according to claim 4, wherein the protocol is a one of H.323 protocol or SIP protocol.

6. The method according to claim 1, wherein the method further comprises:
   receiving, by the terminal in the private network, the media streams from the terminal in the public network;
   wherein the destination address of the media streams is replaced with the address of the terminal in the private network in accordance with the mapping relationship by an address translating device.

7. A method for implementing traversal of multimedia protocols through a Network Address Translation (NAT) device for enabling a terminal in a private network to access a public network with a common address, the method comprising:
   acquiring, by the terminal in the private network, an address of a terminal in a public network for sending media streams;
   sending, by the terminal in the private network, a redirect packet to the terminal in the public network, in which a destination address of the redirect packet is the address of the terminal in the public network for sending media streams;
   wherein a source address in the redirect packet is replaced with the common address by the NAT device, the replaced redirect packet is sent to the terminal in the public network by the NAT device, a mapping relationship between the source address in the redirect packet before the replacement and the common address in the redirect packet after the replacement is established by the NAT device;
   receiving, by the terminal in the private network, the media streams from the terminal in the public network;
   wherein a destination address of the media streams is the common address, the destination address in the media streams is replaced by the NAT device with the address of the terminal in the private network in accordance with the mapping relationship; and
   wherein the terminal in the private network sends redirect packets periodically to refresh timeout time for the mapping relationship.

8. The method according to claim 7, wherein before acquiring, by the terminal in the private network, the address of the terminal in the public network for sending media streams, the method comprises:
   receiving, by the terminal in the private network, an Open Media Channel Ack (OMC Ack) signaling from the terminal in the public network; and
   starting a timer.

9. The method according a to claim 8, wherein a time interval of the timer is shorter than a time for which the terminal in the private network disconnects automatically when no code stream received.

10. The method according to claim 7, wherein the terminal of the private network performs interaction through an extension field in a protocol message when the terminal of the private network sends a request message to the terminal in the public network.

11. The method according to claim 10, wherein the protocol is a one of H.323 protocol or SIP protocol.

12. A terminal in a private network configured to obtain media streams from a terminal in a public network, comprising
   a processor configured to implement a method comprising:
   acquiring an address of a terminal in the public network for sending media streams;
   sending a redirect packet to the terminal in the public network via an address translating device which is configured to replace a source address in the redirect packet with a common address of the address translating device and is configured to establish a mapping relationship between the source address in the redirect packet before the replacement and the common address in the redirect packet after the replacement, in which a destination address of the redirect packet is the address of the terminal in the public network for sending media streams;
receiving the media streams from the terminal in the public network via the address translating device which is further configured to replace a destination address of the media streams, which is the common address, with the address of the terminal in the private network according to the mapping relationship; and wherein the terminal in the private network sends the redirect packets periodically to an address translating device to refresh timeout time for the mapping relationship.

* * * * *

UNITED STATES PATENT AND TRADEMARK OFFICE
CERTIFICATE OF CORRECTION

| | |
|---|---|
| PATENT NO. | : 8,102,856 B2 |
| APPLICATION NO. | : 12/661047 |
| DATED | : January 24, 2012 |
| INVENTOR(S) | : Shu Yang |

It is certified that error appears in the above-identified patent and that said Letters Patent is hereby corrected as shown below:

IN THE CLAIMS:

Column 6, Claim 6, line 5, delete "in accordance with the mapping relationship".

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,102,856 B2  Page 1 of 1
APPLICATION NO. : 12/661047
DATED : January 24, 2012
INVENTOR(S) : Shu Yang It is certified that error appears in the above-identified patent and that said Letters Patent is hereby corrected as shown below:

Title Page

In # (63) Related Application Data, please correct as follows:

After "now U.S. Pat. No. 7,706,370" please insert the following -- , which claims priority to International Application No. PCT/CN2004/001007, filed on Aug. 31, 2004 --

Signed and Sealed this
Eighth Day of December, 2015

Michelle K. Lee
*Director of the United States Patent and Trademark Office*